US006814376B2

(12) United States Patent
Yu et al.

(10) Patent No.: US 6,814,376 B2
(45) Date of Patent: Nov. 9, 2004

(54) METHOD AND SYSTEM FOR GENERATING SHORT PULSE SIGNALS

(75) Inventors: Jianjun Yu, Murray Hill, NJ (US);
Keisuke Kojima, Bridgewater, NJ (US)

(73) Assignee: Triquint Technology Holding Co., Hillsboro, OR (US)

( * ) Notice: Subject to any disclaimer, the term of this patent is extended or adjusted under 35 U.S.C. 154(b) by 194 days.

(21) Appl. No.: 10/214,532

(22) Filed: Aug. 8, 2002

(65) Prior Publication Data

US 2004/0028355 A1 Feb. 12, 2004

(51) Int. Cl.[7] .............................. G02B 6/00; G02B 6/36
(52) U.S. Cl. ...................... 285/122; 385/123; 385/147
(58) Field of Search ................................. 385/122–129

(56) References Cited

U.S. PATENT DOCUMENTS 6,363,090 B1 * 3/2002 Wintner et al. ............... 372/21
2003/0147434 A1 * 8/2003 Hong et al. ................... 372/25

OTHER PUBLICATIONS

Boivin, L. et al., "A Supercontinuum Source Based on an Electroabsorption–Modulated Laser for Long Distance DWDM Transmission," IEEE Photonics Technology Letters, vol. 12, No. 12, p.p. 1695–1697, Dec. 2000.
Mamyshev, P.V., "All–Optical Data Regeneration Based on Self–Phase Modulation Effect," ECOC, Sep. 20–24, 1998, pp. 475–476.

Mikkelsen, G. et al., "Unrepeated Transmission Over 150km of Nonzero–Dispersion Fibre at 100 Gbit/s with Semiconductor Based Pulse Source, Demultiplexer and Clock Recovery," Electronics Letters, vol. 35, No. 21, p.p. 1866–1868, Oct. 14, 1999.
Suzuki, Masatoshi et al., "Transform–Limited Optical Pulse Generation up to 20–GHz Repetition Rate by a Sinusoidally Driven InGaAsP Electroabsorption Modulator,"IEEE Journal of Lightwave Technology, vol. 11, No. 3, p.p. 468–473, Mar. 1993.
Greenfield, D., "Fiber and Optical Networking," Network-Magazine.com, 4 pages (Jul. 5, 2001) (visited Jun. 18, 2002).

* cited by examiner

*Primary Examiner*—Akm Enayet Ullah
(74) *Attorney, Agent, or Firm*—Duane Morris LLP

(57) ABSTRACT

A short pulse generation system and method of generating a short pulse signal are provided. The system includes a fiber chain having an input for receiving an optical signal having a plurality of optical pulses. The fiber chain is nonlinear with respect to the optical signal and includes a first normal fiber segment having a relatively small chromatic parameter, a first abnormal fiber segment having a relatively large chromatic parameter coupled to an output of the first normal fiber segment, and a second abnormal fiber segment having a relatively small chromatic parameter coupled to an out of the first abnormal fiber segment. The system includes a filter stage coupled to an output of the fiber chain and that has a transparent wavelength selected to regenerate the signal. A short pulse signal is produced when the optical signal is coupled to the input.

25 Claims, 6 Drawing Sheets

10

100

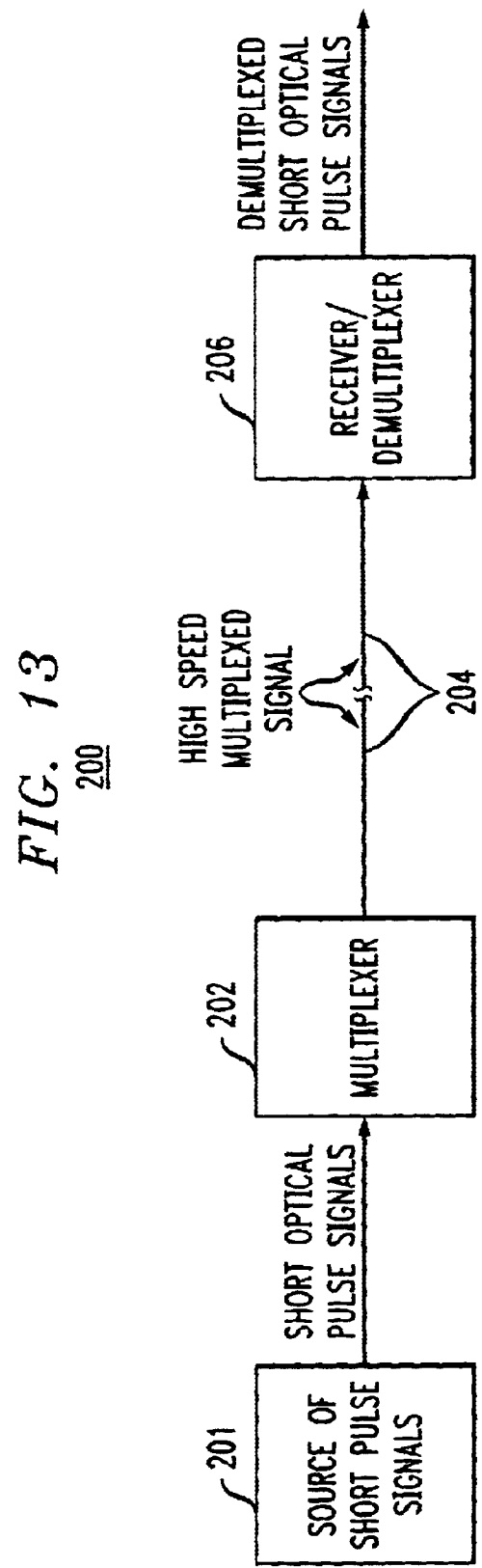

METHOD AND SYSTEM FOR GENERATING SHORT PULSE SIGNALS

FIELD OF THE INVENTION

The present invention relates to optical transmission systems and more particularly to methods and systems for generating short pulse signals such as for high-speed transmission thereof.

BACKGROUND OF THE INVENTION

Generation of ultra-short optical pulses is a necessity for high-speed transmission systems, such as those utilizing optical time division multiplexing. For a 160 Gbit/s OTDM signal, the pulse width should be smaller than 2 ps and have an extinction ratio of 30 dB or larger. Generating these ultra-short pulses in a simple, stable and high-quality manner, however, has proven challenging.

Electroabsorption modulators are currently thought to be one of the most practical return-to-zero (RZ) optical sources. Unfortunately, when an electroabsorption modulator is driven by a 10 GHz sinusoidal electrical signal, the pulse width at full width at half maximum (FWHM) is usually larger than approximately 20 ps. Compression is therefore necessary before the signal can be multiplexed into a higher bit rate.

One method of performing this compression is set forth in L. Boivin et al., "A Supercontinuum Source based on an Electroabsorption-Modulated Laser for Long Distance DWDM Transmission," IEEE Photonics Technology Letters, Vol. 12, No. 12, December 2000, p.p. 1695–1697, the entirety of which is hereby incorporated by reference herein. The approach suggested by Boivin utilizes two nonlinear fiber stages to compress the signal pulses. Each stage includes an erbium doped fiber amplifier (EDFA), a dispersion-shifted fiber (DSF) length having a normal dispersion, a single-mode fiber (SMF) having an abnormal dispersion, an optical filter, a polarization controller and a polarizer. The first stage compresses a 21.5 ps pulse signal from an electroabsorption-modulated laser (EML) to 6 ps. The second stage is used to further reduce the pulse time from about 6 ps to about 2.7 ps. The optical filter is used to select a region of the spectrum having a linear chirp. Because the filter has its transparent wavelength far away from the center wavelength of the signal, the signal power is lost after this optical filter. Therefore, the amplifier is needed to amplify the signal before the second stage, and the amplified signal is then compressed in the second stage.

The approach of Boivin et al. provides short pulses having pulse widths as low as 2.7 ps, which are not appropriate for high-speed 160 Gbit/s or more OTDM transmissions. The approach also requires two compression stages, each including the aforementioned components. Also, because of the need to amplify the signal received from the first stage, the approach is somewhat power inefficient. Therefore, there remains a need for a simpler and more power efficient approach to generating short-pulse signals.

SUMMARY OF THE INVENTION

A short pulse generation system and method of generating a short pulse signal are provided. The short pulse generation system includes a fiber chain having an input for receiving an optical signal having a plurality of pulses. The fiber chain is nonlinear with respect to the optical signal. The fiber chain includes a first normal fiber segment having a relatively small chromatic parameter, a first abnormal fiber segment having a relatively large chromatic parameter coupled to an output of the first normal fiber segment, and a second abnormal fiber segment having a relatively small chromatic parameter coupled to an output of the first abnormal fiber segment. The system also includes a filter stage coupled to receive the optical signal from the fiber chain. The filter stage has a transparent wavelength selected to regenerate the optical signal. A short pulse signal is generated when the optical signal is coupled to the input. A simpler, stable and power efficient system and method for generating ultra short pulses is thereby provided. Also, by selecting a filter with two transmission channels, two short pulse signals can be produced, alleviating the need for an optical coupler for dividing the power of the optical signal and two optical filters for regenerating the divided optical signals, as would be necessary, for example, with the system of Boivin.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which:

FIG. 13 is a block diagram of a high-speed optical transmission system.

DETAILED DESCRIPTION

Figure 1:
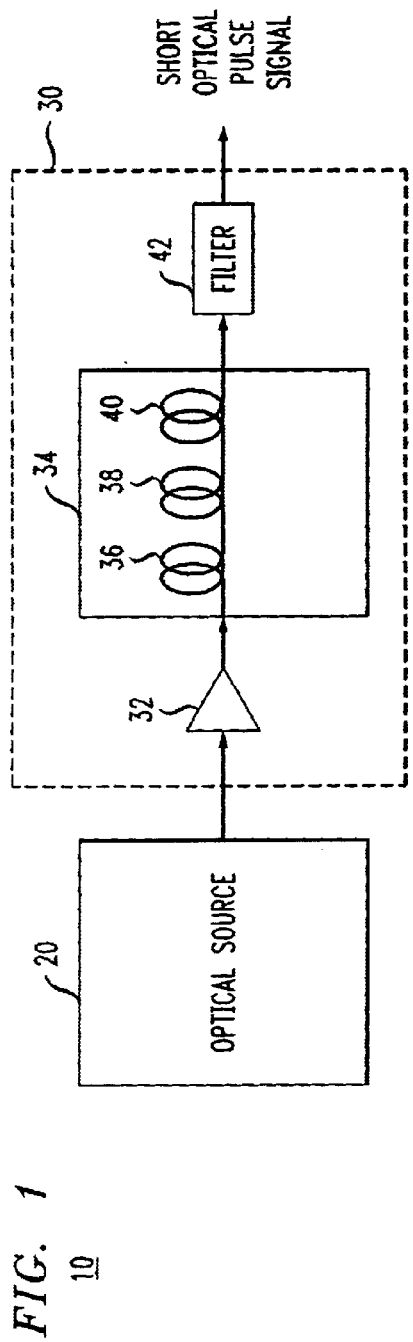
FIG. 1 is a block diagram of a system for generating a short optical pulse signal.

FIG. 1 is a block diagram of an optical system 10 for providing a short optical pulse signal. The basic components of the system 10 are first described, followed by a description of a design example illustrated in FIG. 2 and a discussion of design criteria and results. Although the description is provided herein in the context of generating a short optical pulse signal having sub-2 picosecond (ps) pulses from a 20 ps pulse signal, it should be understood that the approach described herein is applicable to other pulse widths.

The system 10 includes a source 20 of an optical signal, such a signal having 20 ps optical pulses, and a sub-system 30 for converting the source signal into the short pulse signal. The optical signal provided by the source 20 is provided to an amplifier 32 in sub-system 30 that amplifies the optical signal before entry into nonlinear fiber chain 34. Nonlinear fiber chain 34 includes three single-mode fiber segments. The first fiber segment 36 is a normal fiber segment having a relatively small chromatic parameter, preferably having a magnitude of 2 ps/nm/km or less. This fiber segment may include, for example, a dispersion-shifted fiber or a highly nonlinear optical fiber. The first optical fiber segment 36 broadens the optical spectrum of the optical signal. The second fiber segment 38 is an abnormal fiber segment having a relatively large chromatic parameter, preferably having a magnitude of 16 ps/nm/km or greater. This fiber segment may include a standard single-mode fiber or segment, generally having a dispersion at or near 17 ps/nm/km. This fiber segment compresses the pulses of the optical signal and compensates for the dispersion accumulated in the first fiber segment 36. A third fiber segment 40 is disposed following the abnormal fiber 38. The third fiber segment 40 is an abnormal fiber segment that also compresses the pulses of the optical signal and broadens the optical spectrum of the optical signal. The third fiber segment 40 also has a relatively small chromatic parameter, preferably having a magnitude of 2 ps/nm/km or less. This fiber may also include, for example, a dispersion-shifted fiber or a highly nonlinear optical fiber.

Following the nonlinear fiber chain 34 is an optical filter 42 having a transparent wavelength away from the center wavelength of the optical signal, thereby regenerating the shortened optical pulses. The theory and details of this regeneration technique are provided in Mamyshev, P. V., "All-Optical Data Regeneration Based on Self-Phase Modulation Effect," ECOC'98, September 1998, Madrid, Spain, the entirety of which is hereby incorporated by reference herein, and are not repeated herein except for purposes of clarity. This filter may also serve to further compress the pulse with a carefully selected filter wavelength. Generally, the distance that the filter transparent wavelength should be from the transmission wavelength depends upon what kind of optical filter is used. If the filter has a high channel isolation, for example, the filter transparent wavelength can be only approximately 0.2 nm away from the signal wavelength and still regenerate the optical signal.

Figure 2:
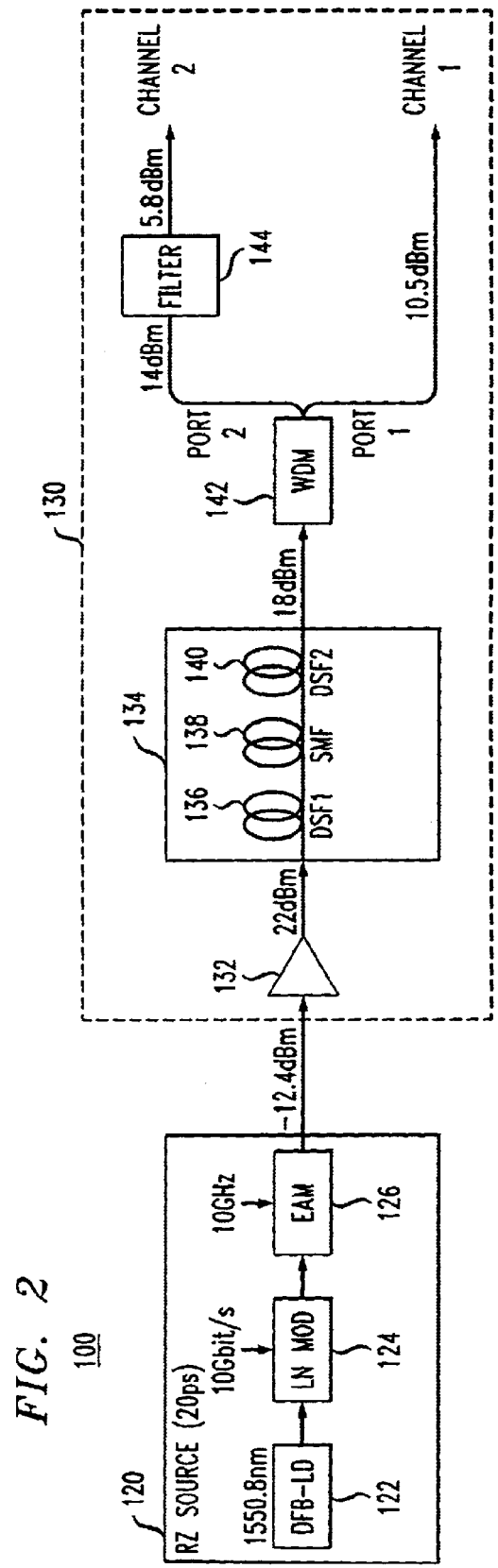
FIG. 2 is a block diagram of a test system for generating a short optical pulse signal.

Referring to FIG. 2, a design example of a system 100 for providing short pulse optical signals is shown. This system was tested by applicants as described hereafter. System 100 includes a source of a return-to-zero (RZ) data optical signal 120 and a sub-system 130 for converting the source signal into a short pulse signal. A continuous wave (CW) signal was generated using a distributed feedback laser diode (DFB-LD) 122. The optical signal had measured average optical power of 11 dBm and a carrier wavelength of 1550.8 nm. The CW signal generated by DFB-LD 122 was encoded with data including a pseudo-random bit sequence word length $2^{31} - 1$ at 10 Gbit/s to create a non return-to-zero (NRZ) data signal using a LiNbO3 (lithium-niobate) modulator 124. The pulsewidth of the NRZ signal was approximately 48 ps.

It should be understood that the modulator 124 is not needed in order to generate the short pulses, and the short pulse signal can be modulated with data after generation thereof, but the input power to the nonlinear fiber chain 134 is increased if the encoding occurs before the nonlinear fiber chain 134. Once the encoding occurs, the signal includes "1"s and "0"s. The number of "1"s and "0"s is equal on average, and there is no energy in "0"s. If there is no encoding, there are only "1"s. In the case of the same average power, the latter (without encoding) will have only half of "1" peak power as the former (with encoding). As explained below, nonlinear effect is proportional to the peak power of "1"s. In order to get the same peak power, the latter, therefore, will need double the average power relative to the former before being provided to nonlinear fiber chain 134.

Figure 3:
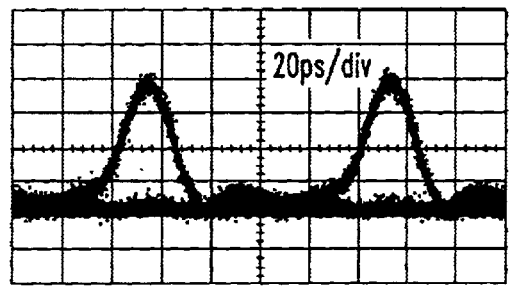
FIG. 3 is an eye diagram of a return-to-zero signal provided by the RZ source of FIG. 2.

An electroabsorption (EAM) modulator 126 was coupled following the lithium-niobate modulator 124. EAM 126 was driven by a 10 GHz sinusoidal waveform electrical signal to carve the signal, i.e., to convert the non-return-to-zero signal from the modulator 124 to a return-to-zero signal. After the electroabsorption modular 126, the pulse width (FWHM) of the signal was 24 ps, as shown by the eye diagram of FIG. 3. Because the extinction ratio of the electroabsorption modulator 126 was only 9 dB, the extinction ratio of the optical signal at this point as measured by an optical power meter was very small, approximately only −12.4 dBm. The 20 ps RZ signal was then provided to sub-system 130 and amplified up to 22 dBm with erbium doped fiber amplifier 132. The amplified signal was then propagated through the non-linear fiber chain 134.

Whether an optical fiber is linear or nonlinear with respect to a signal depends on the following two parameters: fiber nonlinear length $L_{NL}$ and fiber dispersion length $L_D$. Fiber nonlinear length $L_{NL}$ is defined as follows:

$$\text{Equation (1): } L_{NL} = \frac{1}{\gamma P_0}$$

where $\gamma$ is the nonlinear coefficient measured in per Watt per kilometer (/W/km) and $P_0$ is the input power of the optical signal measured in Watts. Nonlinear length is, therefore, power dependent—the larger the input power, the smaller the fiber nonlinear length and the larger the nonlinear effect.

Fiber dispersion length $L_D$ is defined as follows:

$$\text{Equation (2): } L_D = \frac{2\pi C T_0^2}{|\lambda^2 D|}$$

where C is the optical speed measured in meters per second (m/s), $T_0$ is the initial pulse width of the signal measured in picoseconds, $\lambda$ is the optical wavelength of the carrier signal measured in nanometers, and D is the chromatic parameter (also know as dispersion parameter) measured in ps/nm/km. The chromatic parameter D represents the amount of broadening in picoseconds that would occur in a pulse with a bandwidth of 1 nm while propagating through 1 km of fiber.

If $L_{NL}$ is much greater than $L_D$, such as in the order of twice as large, then the nonlinear effect is small and the signal only suffers from the dispersion effect. Such a fiber is said to be "linear" with respect to the signal. If $L_{NL}$ is near $L_D$, the signal will suffer from both dispersion and nonlinear effects. If $L_{NL}$ is much less than $L_D$, such as in the order of one half as large, then the signal will mainly suffer from the nonlinear effect. The fiber is said to be "nonlinear" with respect to the signal. It is the nonlinear effect that gives rise to self-phase modulation effect, which allows for compression of optical pulses.

In a normal (i.e., negative chromatic parameter—input signal wavelength is shorter than the zero dispersion wavelength of the fiber) dispersion fiber, the pulse will also be broadened, along with the optical spectrum of the propagated signal. In an abnormal (i.e., positive chromatic parameter—input signal wavelength is longer than the zero dispersion wavelength of the fiber) dispersion fiber, the pulse will be broadened or compressed depending upon the parameters $L_{NL}$ and $L_D$, as explained above.

Standard single-mode fibers either compress or broaden the pulse dependent upon the input signal power and chirp of the signal. Negative chirp signals are compressed in standard single-mode fibers. Positive chirp signals, however, are broadened in standard single-mode fibers. Assuming that the input signal is chirp-free, the product of the spectrum width and pulse width for any pulse shape has a limited value. If the product of the spectrum width and pulse width is larger than the limited value, it shows that the pulse or signal has chirp. A signal generally has a lot of optical spectrum. In a normal dispersion fiber, the long wavelength spectrum transmits faster than the short wavelength spectrum, indicating negative chirp. In an abnormal dispersion fiber, the short wavelength spectrum transmits faster than the long wavelength spectrum, indicating positive chirp. In order to compress an optical signal in a standard single-mode fiber, negative chirp should be generated, such as by a normal dispersion fiber segment 136 described hereafter.

In the present system, the amplifier 132 amplified the optical signal, as mentioned, to approximately 22 dBm, thereby providing sufficient input power to the fiber chain 134 such that the whole fiber chain 134 is nonlinear with respect to the signal. The first dispersion-shifted fiber 136 of the fiber chain 134 and standard single-mode fiber 138 compress the pulse to a first short pulse width. The second dispersion-shifted fiber 140 further compresses the pulse to the desired shorter pulse width before regeneration by filter 142.

In the system 100 of FIG. 2, dispersion-shifted fiber 136 is a normal dispersion-shifted fiber with zero dispersion wavelength at 1560 nm and a length of 12 km. The fiber had a relatively small negative chromatic parameter of −2 ps/nm/km. Therefore, both optical spectrum and pulse width of optical signal were broadened in the fiber 136 and a negative chirp was induced. Standard single-mode fiber 138 was an abnormal standard single-mode fiber having a length of 2 km and a relatively large positive chromatic parameter of 16 ps/nm/km. The accumulated dispersion of normal dispersion-shifted fiber 136 and the negative chirp generated in the normal dispersion-shifted fiber 136 should and were compensated by the standard single-mode fiber 138. Dispersion-shifted fiber 136 and single-mode fiber 138 cooperated to compress the pulse width of the pulses of the signal to 5 ps. Dispersion-shifted fiber 140 then further compressed the 5 ps pulse to approximately 2 ps Dispersion-shifted fiber 140 is an abnormal dispersion-shifted fiber having a length of 2.5 km and zero dispersion wavelength of 1548 nm. The fiber 140 had a relatively small positive chromatic parameter of 0.5 ps. The lengths of dispersion-shifted fibers 136 and 140 can be reduced if the fibers are replaced by high-nonlinear fibers, meaning the nonlinear coefficient λ is higher.

The optical signal provided by the nonlinear fiber chain 134 had an optical power of 18 dBm, indicating the total loss of the fiber chain 134 was approximately 4 dBm. An optical filter was utilized to regenerate the pulses of the optical signal and to further compress the pulses as shown below. In the system 100, a two channel wavelength division multiplexer filter 142 was used to filter the signal, although other single channel optical filters having transparent frequencies away from the center frequency of the optical signal may be utilized to regenerate the signal, assuming that the transparent frequencies are not too far away from the center frequency of the optical signal, which would cause the signal-to-noise ratio of the signal to be small. In one embodiment, a wavelength division multiplexer with proper bandwidth may be used as a filter.

Figure 4A:
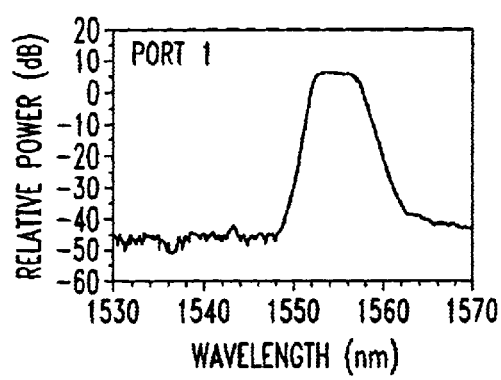
FIGS. 4A and 4B are spectrum diagrams of the transmission performance of ports 1 and 2, respectively, of the WDM filter of FIG. 2.
Figure 4B:
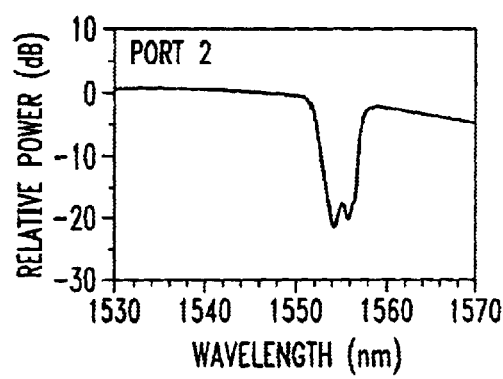

The transmission performance of filter 142 is shown in FIG. 4. It can be seen from FIG. 4 that the transparent wavelength of port 1 is away from the input signal center wavelength of 1550.8 nm. The transparent wavelength of port 2 of the selected wavelength-division multiplexer filter is not far from the input signal center wavelength. Therefore, in order to regenerate the signal from port 2, a second optical filter 144 was cascaded with port 2 to suppress and regenerate the signal at port 2 of WDM filter 142. This additional optical filter is unnecessary if the transmission performance of the WDM filter 142 at port 2 was designed to have a port 2 transparent wavelength farther away from the input signal center wavelength of 1550.8 nm.

Figure 5A:
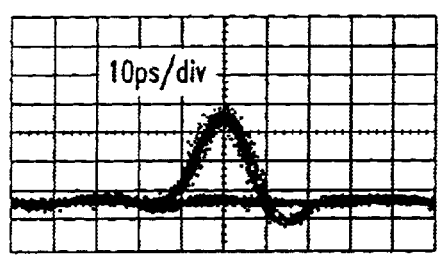
FIGS. 5A–5C are an eye diagram, auto-correlator trace and optical spectrum graph, respectively, of the optical signal at port 1 of FIG. 2.
Figure 5B:
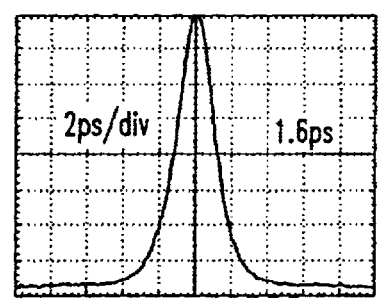
Figure 5C:
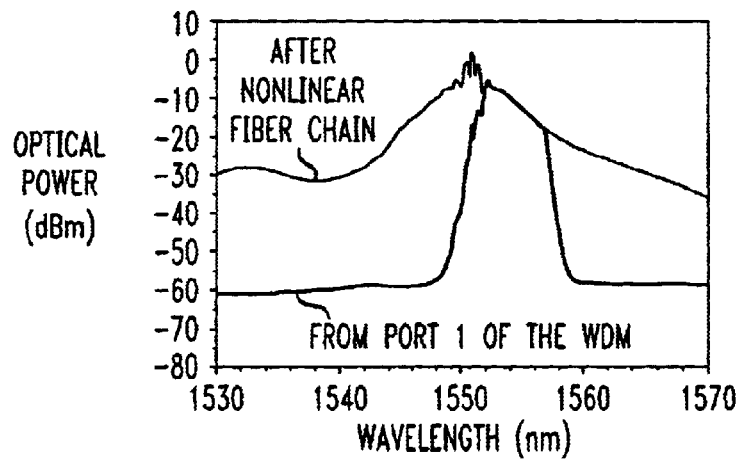

After the WDM filter 142, two different wavelength signals are obtained. Of course, if a single channel optical filter were used, only one signal would be obtained. Because the center wavelength of port 1 is shifted from the center wavelength of the DFB-LD 122, the signal is regenerated and a high quality signal is obtained. The average optical power of the signal at port 1 was measured at 10.5 dBm, thereby providing sufficient power such that the 10 Gbit/s signal could be multiplexed into a high-speed OTDM signal without additional optical amplification. The short pulse signal may also be used in supercontinuum applications, as explained, for example, in Boivin. FIGS. 5A–5C are the eye diagram, SHG (self-harmonic generator) trace, and optical spectrum, respectively, of the signal from port 1 of WDM filter 142 at channel 1 of system 100. The center wavelength, extinction ratio and pulse width (full width at half maximum (FWHM)) of the signal at channel 1 were measured at 1552 nm, 30 dB and 1.6 ps, respectively. It should be understood that the auto-correlation trace of FIG. 5B is not a real trace of the optical signal and the pulse width from the trace does not indicate actual pulse width. The graph is in Gaussian form, which is wider than the pulse width of the real trace. Auto-correlation trace pulse width is 1.5 times the real pulse width.

Figure 6A:
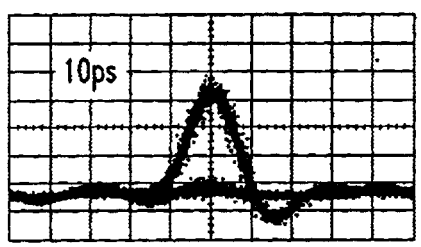
FIGS. 6A–6C are an eye diagram, auto-correlator trace and optical spectrum graph, respectively, of the optical signal at port 2 of FIG. 2 after regeneration.
Figure 6B:
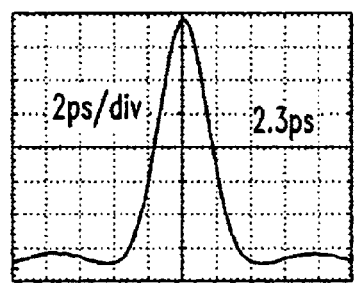
Figure 6C:
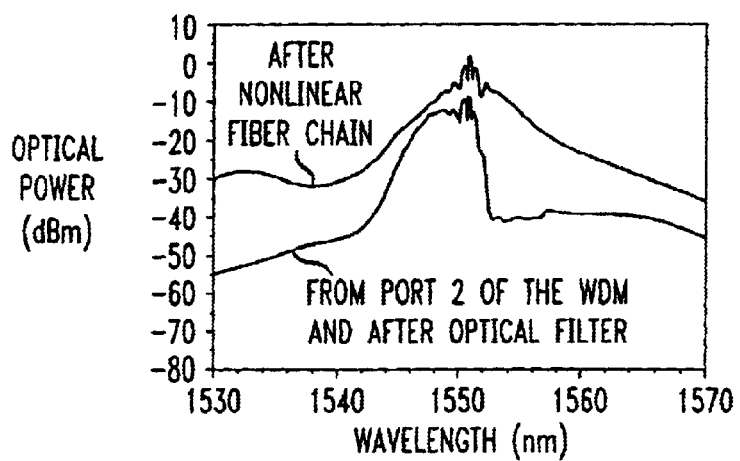

As mentioned, an optical filter 144, which had a 3 dB bandwidth of 3 nm, was used to further suppress and regenerate the signal from port 2 of WDM 142. The output signal at channel 2 after filter 144 had optical power of approximately 5.8 dBm. FIGS. 6A–6C show the eye diagram, SHG optical trace and spectrum, respectively, from the signal from Port 2 as detected at channel 2 after filter 144. The center wavelength of the signal at channel 2 was 1549 nm and the pulse width was 2.3 ps (FWHM). The signal from channel 2 indicated some small side-mode and the pulse width was not narrow enough for some high-speed transmission applications, e.g., for 160 Gbit/s OTDM transmission where the pulse width should be less than 2 ps. It is believed that this result was caused by the imperfect transmission performance of the selected WHM filter 142 with respect to port 2, as described above and shown in FIG. 4. This performance can be improved when the transparent wavelength of port 2 of WHM filter 142 is shifted further away from the center wavelength of 1549 nm, such as to 1548.5 nm or smaller.

Figure 7:
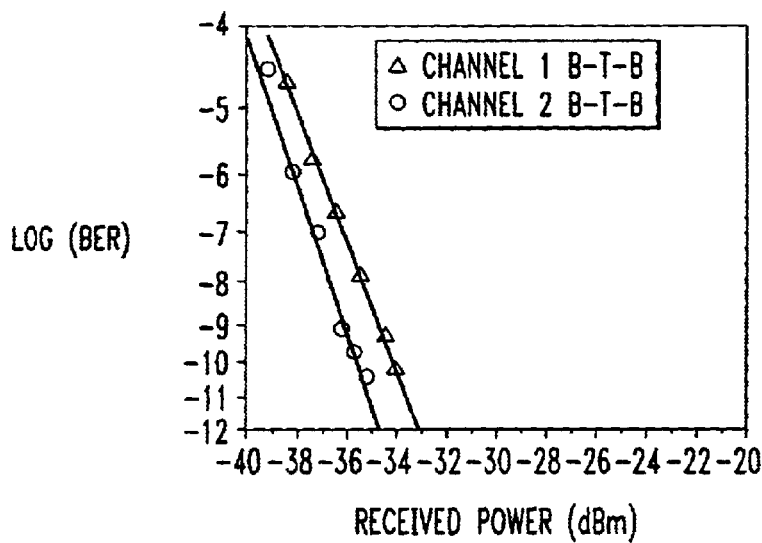
FIG. 7 is a graph of the BER performance for channels 1 and 2 of FIG. 2.

The bit-error ratio (BER) performance was also measured, and the results are illustrated in the graph of FIG. 7. When the input power into a photodiode (receiver) is reduced, the BER will be increased due to the thermal noise and other noise in the photodiode. When the BER is $10^{-9}$, the input power to the photodiode is called "sensitivity." The "sensitivities" for channel 1 and 2 are −36.2 and −34.8 dBm respectively.

Figure 8A:
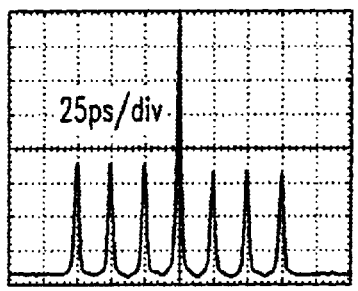
FIGS. 8A–8B are an auto-correlator trace and eye diagram, respectively, of a 40 Gbit/s OTDM signal developed from the short pulse signal from channel 1 of FIG. 2.
Figure 8B:
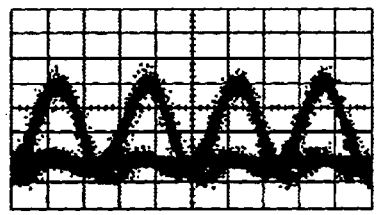
Figure 9A:
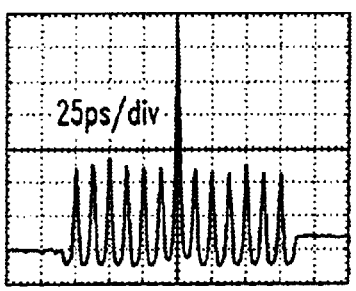
FIGS. 9A–9B are an auto-correlator trace and eye diagram, respectively, of a 80 Gbit/s OTDM signal developed from the short pulse signal from channel 1 of FIG. 2.
Figure 9B:
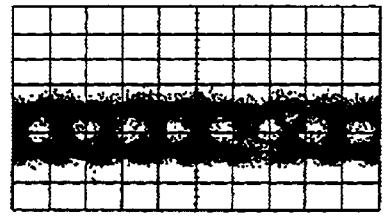
Figure 10A:
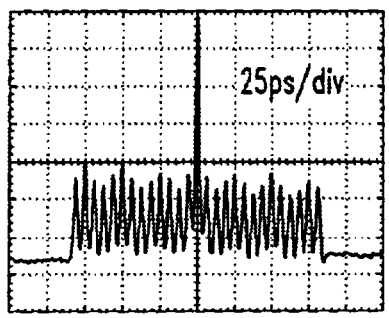
FIGS. 10A–10B are an auto-correlator trace and eye diagram, respectively, of a 160 Gbit/s OTDM signal developed from the short pulse signal from channel 1 of FIG. 2.
Figure 10B:
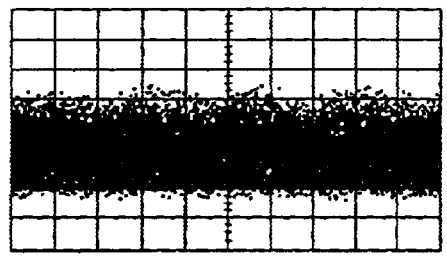

A multiplexer was used to configure a high-speed OTDM signal using the optical signal from channel 1 of system 100 of FIG. 2. Auto-correlation traces and eye diagrams for 40 Gbit/s, 80 Gbit/s and 160 Gbit/s are shown in FIGS. 8A–8B, 9A–9B and 10A–10B, respectively. Traces 8A–10A indicate a peak in the center because the traces are self auto-correlation traces. FIG. 9B, although a denser eye diagram than that FIG. 8B, shows that each channel has the same amplitude. It is also clearly shown from at least FIG. 10A that the channel 1 optical signal satisfies the requirements demanded for a 160 Gbit/s OTDM signal, i.e. narrow pulses smaller than 2 ps with a high extinction ratio.

Figure 11:
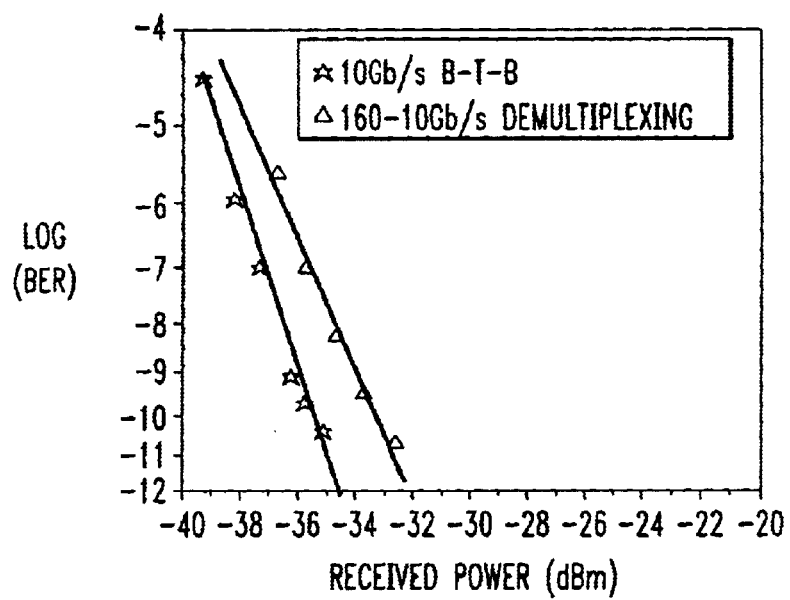
FIG. 11 is a graph comparing the BER performance of a 10 Gbit/s short pulse optical signal with that of a 10 Gbit/s short pulse optical signal demultiplexed from the 160 Gbit/s signal of FIGS. 10A–10B.
Figure 12:
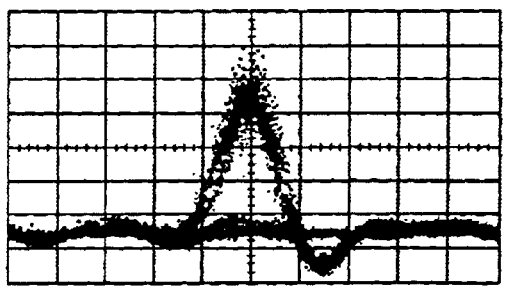
FIG. 12 is an eye diagram of the 10 Gbit/s signal demultiplexed from the 160 Gbit/s signal of FIGS. 10A–10B.

The multiplexed 160 Gbit/s OTDM signal was then demultiplexed by two cascaded electroabsorption modulators, each having a switching window of 5.2 ps. The BER performance after demuliplexing was measured and is shown in FIG. 11. Comparing this demultiplexed signal with a 10 Gbit/s B-T-B (back-to-back, i.e., before transmission) signal, the power penalty is only approximately 2.1 dB. This penalty is likely caused by adjacent crosstalk between the time slots or channels of the OTDM signal and may be eliminated if the switching window for the electroabsorption modulators is narrowed. One channel was extracted from the OTDM signal and FIG. 12 shows the eye diagram for the 10 Gbit/s signal demultiplexed from the 160 Gbit/s signal. A very clear and open eye diagram for the demultiplexed signal from the 160 Gbit/s signal is shown in FIG. 12, indicating that the short pulse signal before multiplexing has good quality.

A method of generating an optical signal having short pulses is also provided herein. An optical signal having a plurality of optical pulses is provided to a first normal fiber segment having a relatively small chromatic parameter, wherein the optical spectrum of the optical signal is broadened. The pulse width of the pulses of the optical signal are compressed with a second fiber segment having a relatively large chromatic parameter. The pulse width of the pulses of the optical signal are then compressed with a third fiber segment having a relatively small chromatic parameter. Each segment is nonlinear with respect to the optical signal. The optical signal is then filtered to regenerate the pulses of the optical signal after compression in the third fiber segment.

FIG. 13 is a block diagram of a high-speed transmission system 200, such as an OTDM transmission system. The system 200 includes a source of short pulse optical signals, such as a plurality of short pulse generation systems 10 or 100 described above with FIGS. 1 and 2. The short pulse optical signals, which may be 10 Gbit/s signals encoded with data, are provided to a multiplexer 202 for multiplexing into a high-speed transmission signal, such as a 160 Gbit/s OTDM signal. The OTDM multiplexer generally includes a group of fiber delay or wave-guide delay lines and an optical coupler for combining the delayed signals into the higher speed OTDM signal. The resultant high speed OTDM signal is then propagated through optical fiber line 204 to a receiver 206, which may include a photodiode receiver and a demultiplexer for demultiplexing the high-speed signal into the slower short pulse optical signals, e.g., 10 Gbit/s data signals.

As mentioned above, the above-described short pulse generation system may also be used in supercontinuum applications, such as the supercontinuum system that is described in Boivin. In such a system, dispersion-shifted fiber segments are provided before the multiplexer 202 and after sources 201 in order to broaden the spectrum of the optical signals and produce supercontinuum.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A short pulse generation system, comprising:
   a fiber chain having an input for receiving an optical signal having a plurality of optical pulses, said fiber chain being nonlinear with respect to said optical signal, said fiber chain including:
      a first normal fiber segment having a relatively small chromatic parameter;
      a first abnormal fiber segment having a relatively large chromatic parameter coupled to an output of said first normal fiber segment;
      a second abnormal fiber segment having a relatively small chromatic parameter coupled to an output of said first abnormal fiber segment; and
   a filter stage coupled to an output of said fiber chain, said filter stage having a transparent wavelength selected to regenerate said optical signal, whereby a short pulse signal is generated when said optical signal is coupled to said input.

2. The system of claim 1, wherein said first normal fiber segment includes a dispersion-shifted fiber or a high nonlinear fiber, said first abnormal fiber segment includes a standard single-mode fiber, and said second abnormal fiber includes a dispersion-shifted fiber or a high nonlinear fiber.

3. The system of claim 1, further comprising an optical amplifier coupled to amplify said optical signal before said fiber chain.

4. The system of claim 1, wherein said filter stage includes a wavelength division multiplexing filter, said multiplexing filter having at least one channel having a transparent wavelength selected to regenerate said optical signal.

5. The system of claim 1, wherein the magnitude of said chromatic parameter of said first normal fiber segment is less than or equal to approximately 2 picoseconds per nanometer per kilometer (ps/nm/km), the magnitude of said chromatic parameter of said first abnormal fiber segment is greater than or equal to approximately 16 ps/nm/km, and the magnitude of said chromatic parameter of said second abnormal fiber is less than or equal to approximately 2 ps/nm/km.

6. A method of generating an optical signal having short pulses, comprising the steps of:
   providing an optical signal having a plurality of optical pulses having a pulse width to a first normal fiber segment having a relatively small chromatic parameter, wherein the optical spectrum of said optical signal is broadened;
   compressing the pulse width of said pulses of said optical signal with a second fiber segment having a relatively large chromatic parameter;
   then, compressing the pulse width of said pulses of said optical signal with a third fiber segment having a relatively small chromatic parameter, wherein each of said segments is nonlinear with respect to said optical signal; and filtering said optical signal to regenerate said pulses of said optical signal after said third fiber segment, whereby an optical signal having short pulses is generated.

7. The method of claim 6, further comprising the step of amplifying said optical signal before said providing step.

8. The method of claim 7, wherein said method includes no intermediate amplification steps between said providing and filtering steps.

9. The method of claim 6, wherein said first fiber segment is a dispersion-shifted fiber or a high nonlinear fiber, said second fiber segment includes an abnormal standard single-mode fiber and said third fiber segment includes an abnormal dispersion-shifted fiber or a high nonlinear fiber.

10. The method of claim 9, wherein the magnitude of said chromatic parameter of said first fiber segment is less than or equal to approximately 2 picoseconds per nanometer per kilometer (ps/nm/km), the magnitude of said chromatic parameter of said second fiber segment is greater than or equal to approximately 16 ps/nm/km, and the magnitude of said chromatic parameter of said third fiber chain segment is less than or equal to approximately 2 ps/nm/km.

11. The method of claim 6, wherein said filtering step includes the step of filtering said optical signal with a filter stage having a transparent wavelength selected to regenerate said optical signal.

12. The method of claim 11, wherein said filter stage includes a wavelength division multiplexing filter, said multiplexing filter having at least one channel having a transparent wavelength selected to regenerate said optical signal.

13. An optical transmission system, comprising:
a plurality of short pulse generation systems, each system providing a short pulse optical signal, each system comprising:
a fiber chain having an input for receiving an optical signal having a plurality of optical pulses, said fiber chain being nonlinear with respect to said optical signal, said fiber chain including:
a first normal fiber segment having a relatively small chromatic parameter;
a first abnormal fiber segment having a relatively large chromatic parameter coupled to receive said optical signal from said first normal fiber segment;
a second abnormal fiber segment having a relatively small chromatic parameter coupled to receive said optical signal from said first abnormal fiber segment; and
a filter stage coupled to receive said optical signal from said second abnormal fiber segment, said filter stage having a transparent wavelength selected to regenerate said optical signal, whereby a short pulse signal is generated when said optical signal is coupled to said input;
a plurality of modulators, said plurality of modulators encoding said optical signals with data; and
a multiplexer, said multiplexer coupled to multiplex said short pulse optical signals into a higher-speed signal for transmission.

14. The system of claim 13, wherein said first normal fiber segment includes a dispersion-shifted fiber or high nonlinear fiber, said first abnormal fiber segment includes a standard single-mode fiber, and said second abnormal fiber segment includes a dispersion-shifted fiber or a high nonlinear fiber.

15. The system of claim 13, wherein said short pulse generation systems each include an optical amplifier coupled to amplify said optical signal before said fiber chain.

16. The system of claim 13, wherein said filter stage includes a wavelength division multiplexing filter, said multiplexing filter having at least one channel having a transparent wavelength selected to regenerate said optical signal.

17. The system of claim 13, wherein the magnitude of said chromatic parameter of said first normal fiber segment is less than or equal to approximately 2 picoseconds per nanometer per kilometer (ps/nm/km), the magnitude of said chromatic parameter of said first abnormal fiber segment is greater than or equal to approximately 16 ps/nm/km, and the magnitude of said chromatic parameter of said second abnormal fiber segment is less than or equal to approximately 2 ps/nm/km.

18. The system of claim 13, wherein said modulators are disposed before said short pulse generation systems.

19. The system of claim 13, wherein said multiplexer is an optical time division multiplexer.

20. The system of claim 13, wherein each of said short pulse generation systems further comprises a source of said optical signal, said source comprising a laser coupled to an electroabsorption modulator.

21. The system of claim 13, further comprising a receiver, said receiver including a demultiplexer, said demultiplexer demultiplexing said short pulse signals from said higher-speed signal.

22. A short pulse generation system, comprising:
a fiber chain having an input for receiving an optical signal having a plurality of optical pulses, said fiber chain being nonlinear with respect to said optical signal, said fiber chain including:
a normal single-mode fiber segment having a relatively small chromatic parameter;
an abnormal standard single-mode fiber segment having a relatively large chromatic parameter coupled to an output of said normal single-mode fiber segment;
an abnormal single-mode fiber segment having a relatively small chromatic parameter coupled to an output of said abnormal standard single-mode fiber;
an optical amplifier coupled before said fiber chain; and
a filter stage coupled to an output of said fiber chain, said filter stage having a transparent wavelength selected to regenerate said optical signal.

23. The system of claim 22, wherein said filter stage includes a wavelength division multiplexing filter, said multiplexing filter having at least one channel having a transparent wavelength selected to regenerate said optical signal.

24. The system of claim 22, wherein the magnitude of said chromatic parameter of said normal single-mode fiber segment is less than or equal to approximately 2 picoseconds per nanometer per kilometer (ps/nm/km), the magnitude of said standard chromatic parameter of said standard abnormal single-mode fiber segment is greater than or equal to approximately 16 ps/nm/km, and the magnitude of said chromatic parameter of said abnormal single-mode fiber segment is less than or equal to approximately 2 ps/nm/km.

25. The system of claim 24, wherein said normal single-mode fiber segment includes a dispersion-shifted fiber or a high nonlinear fiber and said abnormal single-made fiber includes a dispersion-shifted fiber or a high nonlinear fiber.

* * * * *